United States Patent [19]

Tian et al.

[11] Patent Number: 5,402,230
[45] Date of Patent: Mar. 28, 1995

[54] HETERODYNE INTERFEROMETRIC OPTICAL FIBER DISPLACEMENT SENSOR FOR MEASURING DISPLACEMENT OF AN OBJECT

[75] Inventors: Qian Tian; Enyao Zhang, both of Beijing, China; Donglei Tang, Mitaka, Japan; Akira Shimokohbe, 1-20-17 Ogawa, Machida-shi, Tokyo, Japan; Masahiro Akahane, Mitaka, Japan; Kenji Sakai, both of Mitaka, Japan

[73] Assignees: Tsinghua University, Beijing, China; Akira Shimokohbe; Tokyo Seimitsu Co., Ltd., both of Tokyo, Japan

[21] Appl. No.: 989,640

[22] Filed: Dec. 11, 1992

[30] Foreign Application Priority Data

Dec. 16, 1991 [JP] Japan .................. 3-332070
Aug. 7, 1992 [JP] Japan .................. 4-211430
Nov. 5, 1992 [JP] Japan .................. 4-296057

[51] Int. Cl.⁶ ............................. G01B 9/02
[52] U.S. Cl. ......................... 356/349; 356/358; 356/345
[58] Field of Search ................. 356/4.5, 28.5, 345, 356/349, 358, 357; 250/227.19, 227.27

[56] References Cited

U.S. PATENT DOCUMENTS 4,627,731 12/1986 Waters et al. .
4,886,363 12/1989 Jungquist .............. 356/358
4,918,492 4/1990 Ferdinand et al. .
5,106,191 4/1992 Ohtsuka .............. 356/349
5,187,546 2/1993 Johnston .............. 356/358

FOREIGN PATENT DOCUMENTS 63-82344 4/1988 Japan .
63-101702 5/1988 Japan .

OTHER PUBLICATIONS

Journal of Physics E. Scientific Instruments, D. A Jackson, "Monomode Optical Fibre Interferometers for Precision Measurement", Dec. 1985.

Primary Examiner—Samuel A. Turner
Assistant Examiner—Robert Kim
Attorney, Agent, or Firm—Oliff & Berridge

[57] ABSTRACT

A heterodyne interferometric optical fiber displacement sensor using a laser diode. The frequency and the intensity of the laser diode beam are periodically modulated by an injection current. The laser diode beam is routed to a rod lens via a first optical fiber, an optical fiber coupler, and a second optical fiber. The interference light resulting from the interference between the light reflected from the exit surface of the rod lens and the light reflected from an object surface is routed to a third optical fiber via the optical fiber coupler, which is then detected by a photodiode attached to the end of the third optical fiber. From the output of the photodiode, a given frequency component is extracted using a bandpass-filter. The extracted signal is converted into a pulse signal. The frequency change of the pulse signal (equivalent to a doppler frequency shift caused by the movement of the object surface) is accumulated using an electronic circuit. Then, the accumulated value is used to calculate the displacement of the object surface.

12 Claims, 7 Drawing Sheets

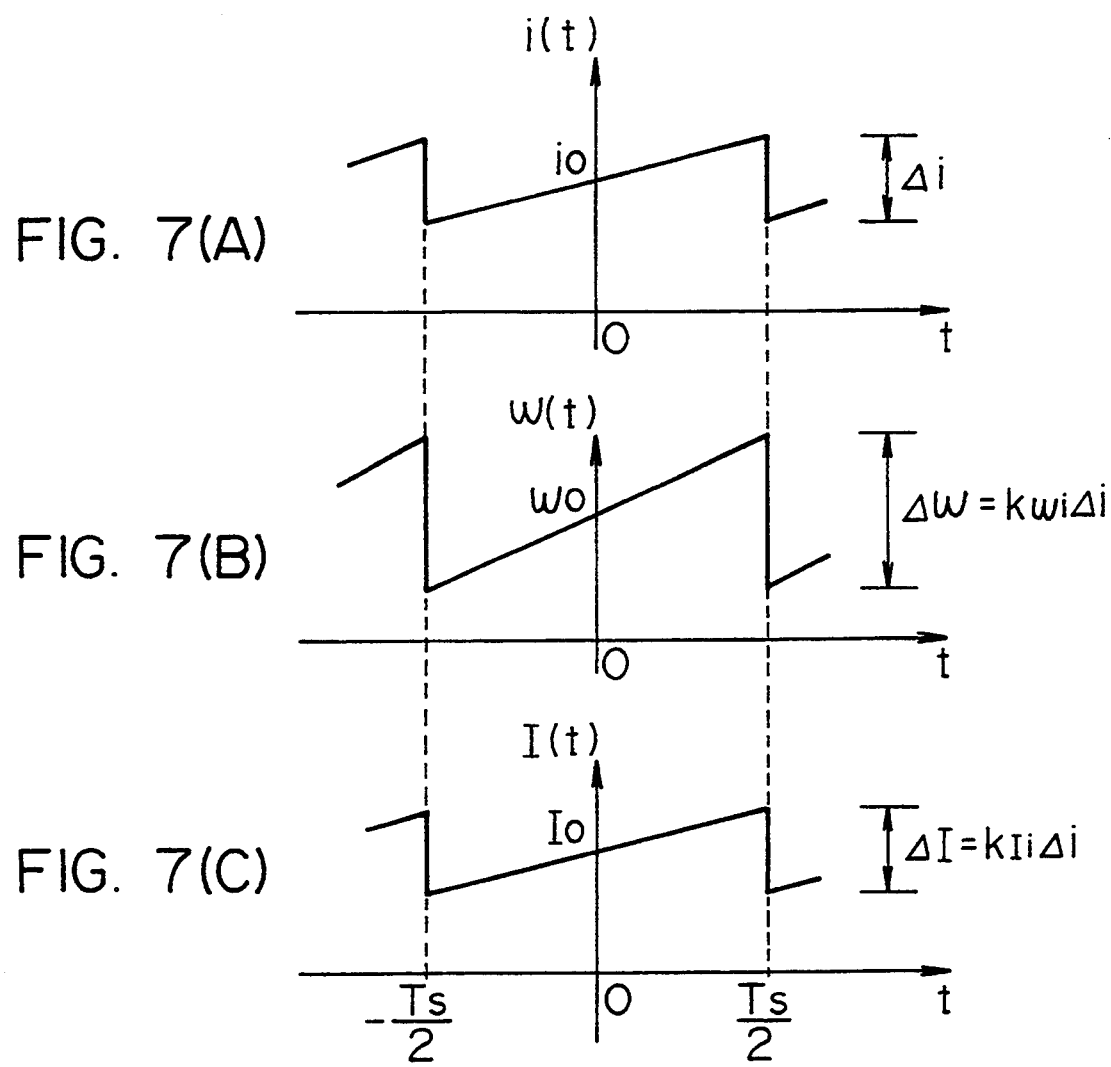

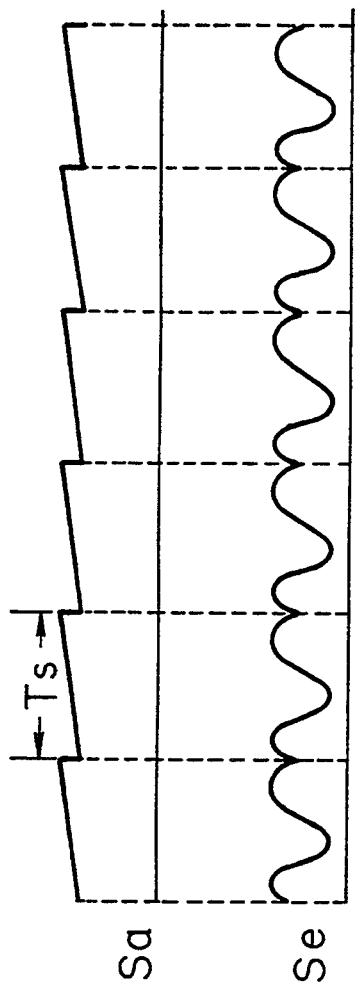

HETERODYNE INTERFEROMETRIC OPTICAL FIBER DISPLACEMENT SENSOR FOR MEASURING DISPLACEMENT OF AN OBJECT

BACKGROUND OF THE INVENTION

1. Field of the Invention

The present invention relates to a heterodyne interferometric optical fiber displacement sensor. More particularly, this invention is concerned with a heterodyne interferometric optical fiber displacement sensor capable of measuring a displacement of an object and an absolute distance from the sensor to the object using a laser diode whose oscillation frequency can be modulated linearly by a drive current.

2. Description of the Related Art

Heterodyne interferometric displacement sensors based on frequency modulation have been known in the past. One example is described in Japanese Patent Application Laid-open No. 63-101702. In this sensor, a triangular waveform current is applied to a laser diode in order to modulate the oscillation frequency and light emission intensity of the laser diode. Then, the laser beam is divided into reference light and object light by a beam splitter. The object light irradiates an object's surface. The reflected light, which is light reflected from the object's surface, is then superimposed on the reference light. A time lag occurs between the reflected light and the reference light because of a distance from the sensor to the object's surface. This time lag causes the frequencies of the reflected light and the reference light to differ from each other. Therefore, the reference light and object light cause a heterodyne interference. The beat frequency is associated with the distance from the sensor to the object's surface. Therefore, when the beat frequency is measured, the displacement of an object under test can be obtained.

However, since the foregoing conventional heterodyne interferometric displacement sensor does not employ any optical fibers as light paths of the laser beam, it is sensitive to any environmental disturbance. It is large in size because of incorporation of the beam splitter. Furthermore, to measure the beat frequency correctly, measurement is only carried out when the object is stationary. This hinders the real-time measurement of a moving object.

On the other hand, a photothermal displacement detection optical fiber interferometer that employs an optical fiber as a light path of laser beams has been proposed in Japanese Patent Application Laid-open No. 63-82344. However, in this interferometer, a half mirror and a dichroic mirror are placed between a light source and the optical fiber. Owing to the mirrors, excitation light emitted from an excitation light source for displacing a sample photothermally and detection light emitted from a detection light source for detecting a photothermal displacement using optical interference enter one end of an optical fiber, and interference light that is reflected from an emission surface at the other end of the optical fiber and from a sample surface and returned through the optical fiber enters a photoelectric converter. Therefore, no optical fiber is present between the light source and one end of the optical fiber, or between one end of the optical fiber and the photoelectric converter. Consequently, the interferometer is, like the aforesaid prior art, easily affected by an environment and large in size.

SUMMARY OF THE INVENTION

The purpose of the present invention is to provide a compact heterodyne interferometric optical fiber displacement sensor that permits the real-time displacement measurement with high resolution and high accuracy.

To realize the above purpose, the present invention comprises a laser diode; a modulation current generating means that outputs a modulation current whose value varies periodically at an interval of $T_s$ with a frequency $f_s$; first, second, third and fourth optical fibers; a first lens for guiding an oscillated laser beam from the laser diode into the tip of the first optical fiber; an optical fiber coupler that optically couples the first, second, third, and fourth optical fibers, and that distributes light transmitted through the first optical fiber into the second and third optical fibers, and routes light returned through the second optical fiber into the fourth optical fiber; a second lens that is attached to the tip of the second optical fiber, and that reflects part of light at the exit surface and transmits the remaining light which will irradiate an object surface; first and second photoelectric transfer devices that are attached to the tips of the third and fourth optical fibers and that photoelectrically transfer incident light coming through the third and fourth fibers; a divider that divides the output of the second photoelectric transfer device by the output of the first photoelectric transfer device; a bandpass filter for extracting a frequency component, whose center frequency is $nf_s$ which is n-fold of the frequency $f_s$, from the output of the divider; a first pulse output means that outputs a pulse signal having a frequency which is m-fold of the frequency of the output wave of the bandpass filter; a second pulse output means that outputs a pulse signal having a frequency which is m-fold of the frequency $nf_s$; and a counter that counts up a frequency difference between pulse signals provided by the first and second pulse output means, which is attributable to the object's movement.

In another mode, the present invention comprises a laser diode; a modulation current generating means that outputs a modulation current whose value varies periodically at an interval of period $T_s$ (frequency $f_s$); first, second, and third optical fibers; a first lens for guiding an oscillated laser beam from the laser diode to the tip of the first optical fiber; an optical fiber coupler that optically couples the first, second, and third optical fibers, that routes light transmitted through the first optical fiber to the second optical fiber and also routes light returned through the second optical fiber to the third optical fiber; a second lens that is attached to the tip of the second optical fiber, and that reflects part of light at the exit surface and transmits the remaining light which will irradiate an object surface; a photoelectric transfer device that is attached to the tip of the third optical fiber and that photoelectrically transfers incident light coming through the third optical fiber; a bandpass filter for extracting a frequency component of $nf_s$, which is n-fold of the frequency $f_s$, from the output of the photoelectric transfer element; a first pulse output means that outputs a pulse signal having a frequency $mnf_s$, which is m-fold of the frequency $nf_s$; a second pulse output means that outputs a pulse signal having a frequency $mnf_s$; and a counter that counts up a frequency difference between pulse signals provided by the first and second pulse output means, which is attributable to the object's movement.

According to the present invention, almost all light paths of the laser beam are constructed with optical fibers and an optical fiber coupler. This causes the sensor to be compact and insensitive to the environment. Since a Doppler frequency shift, which is caused by the movement of the object's surface is utilized, a displacement of a moving object can be measured in real time.

BRIEF DESCRIPTION OF THE DRAWINGS

The exact nature of this invention, as well as other objects and advantages thereof, will be readily apparent in consideration of the following specification relating to the accompanying drawings, in which, like reference characters, designate the same or similar parts throughout the figures thereof and wherein:

FIGS. 7A, 7B, and 7C are waveforms for indicating a sawtooth modulation current fed to a laser diode, and an oscillation angular frequency and a light emitting intensity of the laser diode that are modulated by the modulation current; and FIGS. 8A and 8B are waveforms of signals provided by a ramp generator and a photodiode shown in FIG. 6.

DETAILED DESCRIPTION OF THE INVENTION

Preferred embodiments of a heterodyne interferometric optical fiber displacement sensor according to the present invention will be described in conjunction with the appended drawings.

Figure 1:
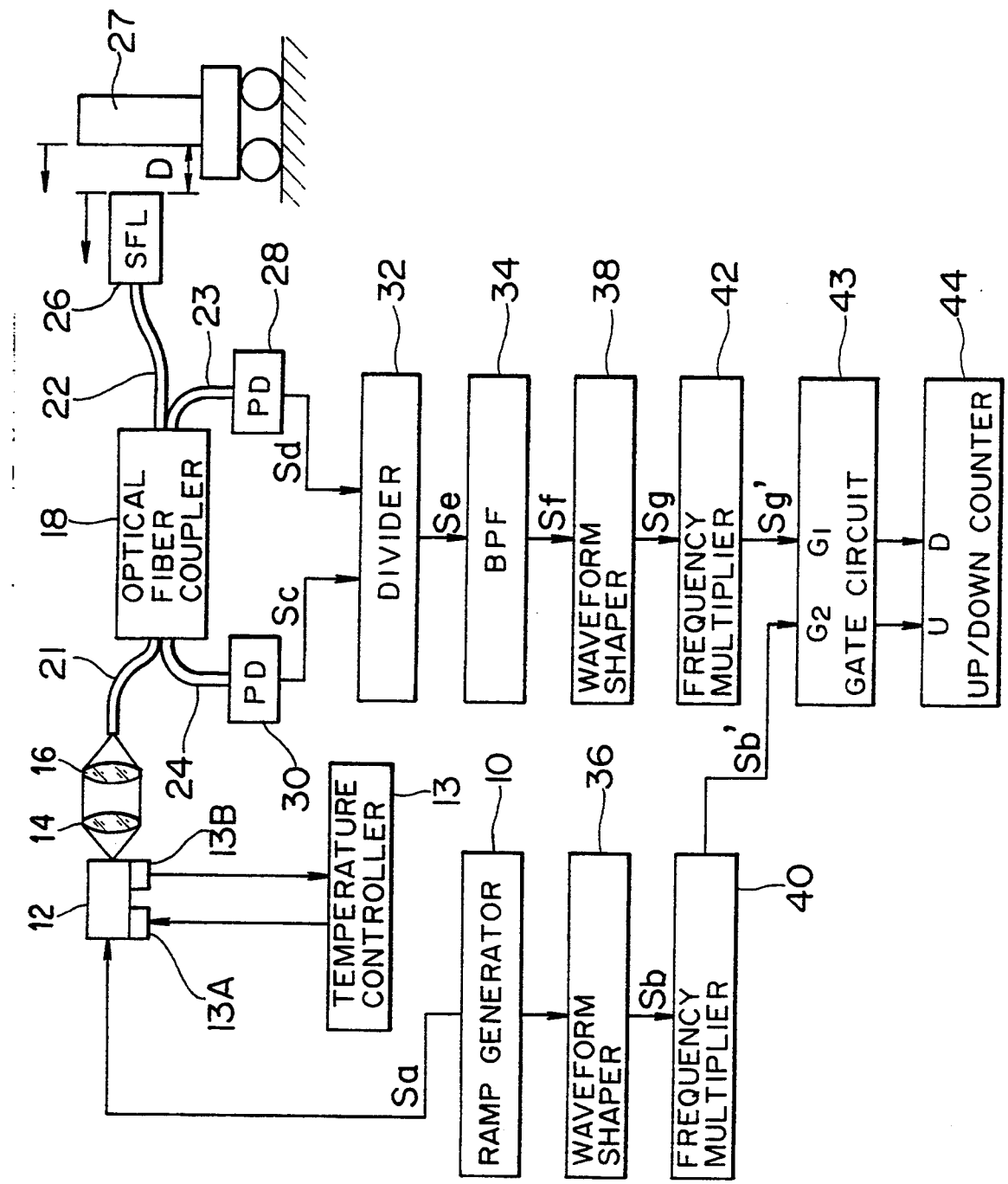
FIG. 1 is a block diagram showing a first embodiment of a heterodyne interferometric optical fiber displacement sensor according to the present invention.

As shown in FIG. 1, the heterodyne interferometric optical fiber displacement sensor comprises a ramp generator 10, a laser diode 12, a collimator lens 14, an objective 16, an optical fiber coupler 18, optical fibers 21 to 24, a rod lens 26, photodiodes 28 and 30, a divider 32, a bandpass filter 34, waveform shapers 36 and 38, frequency multipliers 40 and 42, a gate circuit 43, and an up/down counter 44.

The ramp generator 10 outputs a sawtooth modulation current Sa (FIG. 2A) having a period $T_s$ (frequency $f_s$ or angular frequency $\omega_s$) to the laser diode 12 and waveform shaper 36.

The oscillation frequency and light emission intensity of the laser diode 12 are modulated by the input modulation current Sa. A temperature controller 13 stabilizes the temperature detected by the temperature sensor 13B by using the heating and/or cooling device 13A. Thereby, any change in wavelength due to a temperature variation of the laser diode 12 is prevented.

A modulated laser beam emitted from the laser diode 12 is channelled into the optical fiber 21 via the collimator lens 14 and objective 16. Light passing through the optical fiber 21 is distributed to the optical fibers 22 and 23 via the optical fiber coupler 18.

The rod lens 26 is attached to the tip of the optical fiber 22. The rod lens 26 reflects part of light at the exit surface and collimates (preferably, slight converges) the remaining light which will irradiate a test surface. Light reflected from the exit surface of the rod lens (reference light) and the light reflected from the test (object surface light) is converged by the rod lens and returned to the optical fiber 22.

A time lag associated with a distance D from the exit surface of the rod lens 26 and the object 27 is present between the reference and object light. The reference light and object light have different frequencies, thus causing a heterodyne interference.

The interference light is routed through the optical fiber 22, optical fiber coupler 18, and optical fiber 24, then detected by the photodiode 30, which is attached to the end of the optical fiber 24. The frequency and the phase of the signal Sc detected by the photodiode 30 (FIG. 2C) are proportional to the distance D from the exit surface of the rod lens 26 to the object's surface.

Figure 2:
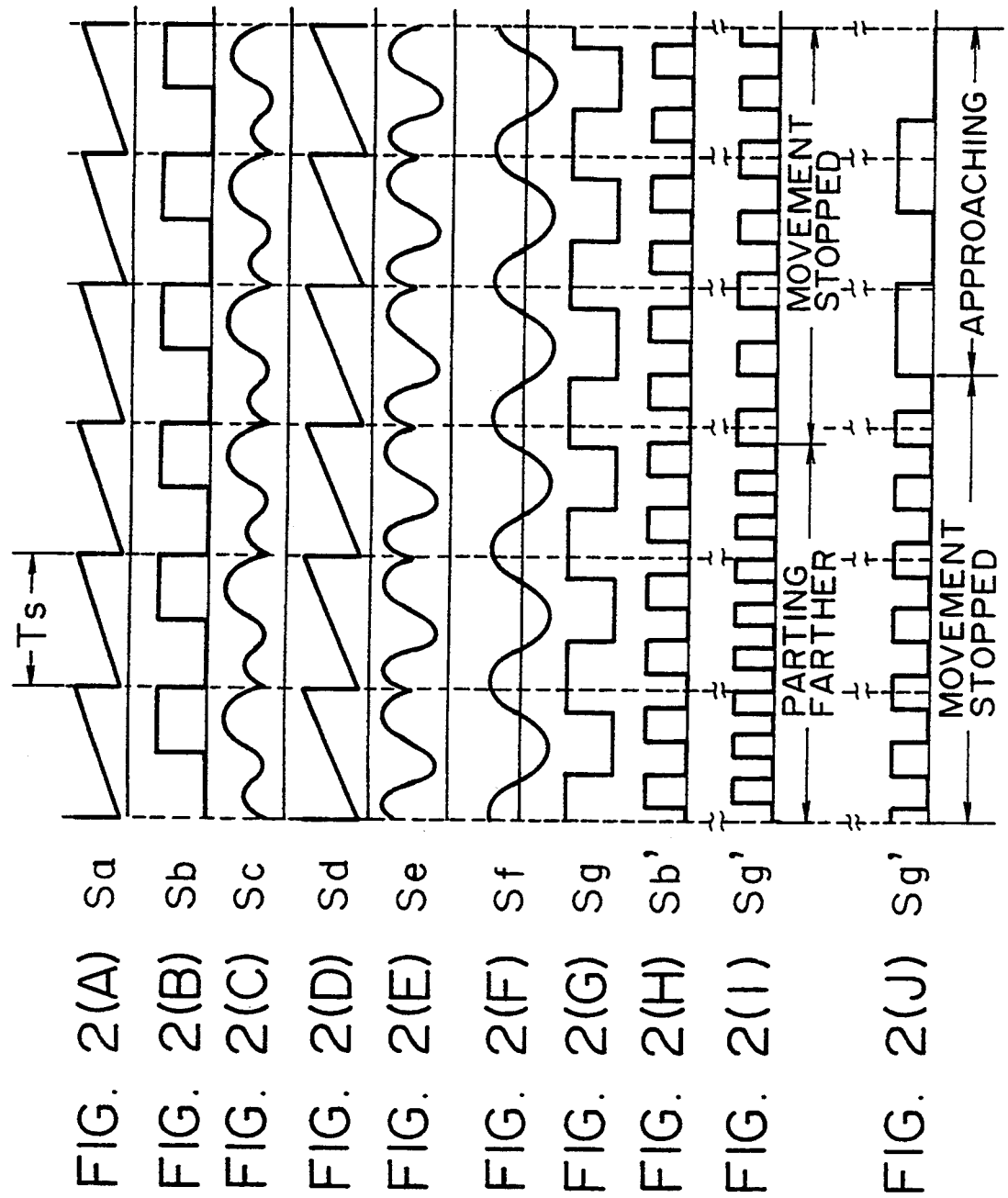
FIGS. 2A, 2B, 2C, 2D, 2E, 2F, 2G, 2H, 2I and 2J are waveforms of signals fed from components shown in FIG. 1.

However, the amplitude of the signal Sc is affected by the light emission intensity of the laser diode 12. In other to remove this effect, the photodiode 28 is attached to the end of the optical fiber 23, which detects a signal Sd representing a light emission intensity of the laser diode 12 (FIG. 2D). The divider 32 divides the signal Sc by the signal Sd and outputs a signal Se (FIG. 2E) to the bandpass filter 34. This eliminates the effect of a change in light emission intensity of the laser diode 12.

The center frequency of the bandpass filter 34 is $f_s$ and the bandwidth is $\Delta v$ (for example, $f_s/10$). The different symbol bandpass filter 34 extracts the $f_s$ component Sf (FIG. 2F) from the input signal Se. The waveform shaper 38 converts the input signal Sf into a rectangular signal Sg (FIG. 2G). The frequency multiplier 42 multiples the frequency of the signal Sg and outputs a pulse signal Sg' to an input port G1 of the gate circuit 43 (See FIGS. 2I and 2J).

On the other hand, the waveform shaper 36 converts the modulation current Sa provided by the ramp generator 10 into a rectangular signal Sb (FIG. 2B). The frequency multiplier 40 multiplies the frequency of the signal Sb by the same multiplying factor as that used in the frequency multiplier 42, and outputs a pulse signal Sb' to the other input port G2 of the gate circuit 43 (See FIG. 2H).

The gate circuit 43 produces the new pulse signals representing the difference in the frequency between the pulse signal Sg' and the pulse signal Sb', then outputs the new pulse signals to the up/down counter 44. Therefore, the up/down counter 44 accumulates the difference in frequency between the pulse signal Sb' and the pulse signal Sg'.

When the object under test 27 is stationary, the frequency of the pulse signal Sg' agrees with the frequency of the reference pulse signal Sb'. Consequently, the output of the up/down counter 44 does not change. When the object under test 27 moves, the frequency of the signal Sg changes the amount of the Doppler frequency. To be more specific, when the object under test 27 moves opposite to the rod lens 26, the frequency of the pulse signal Sg' increases. When the object under test 27 approaches the rod lens 26, the frequency of pulse signal Sg' decreases (See FIG. 2J).

Therefore, the difference in the number of pulses between the pulse signals Sb' and Sg' is associated with the movement of the object 27. The distance by which the object 27 has moved can be obtained from an increment or a decrement in the output of the up/down counter 44.

Figure 3:
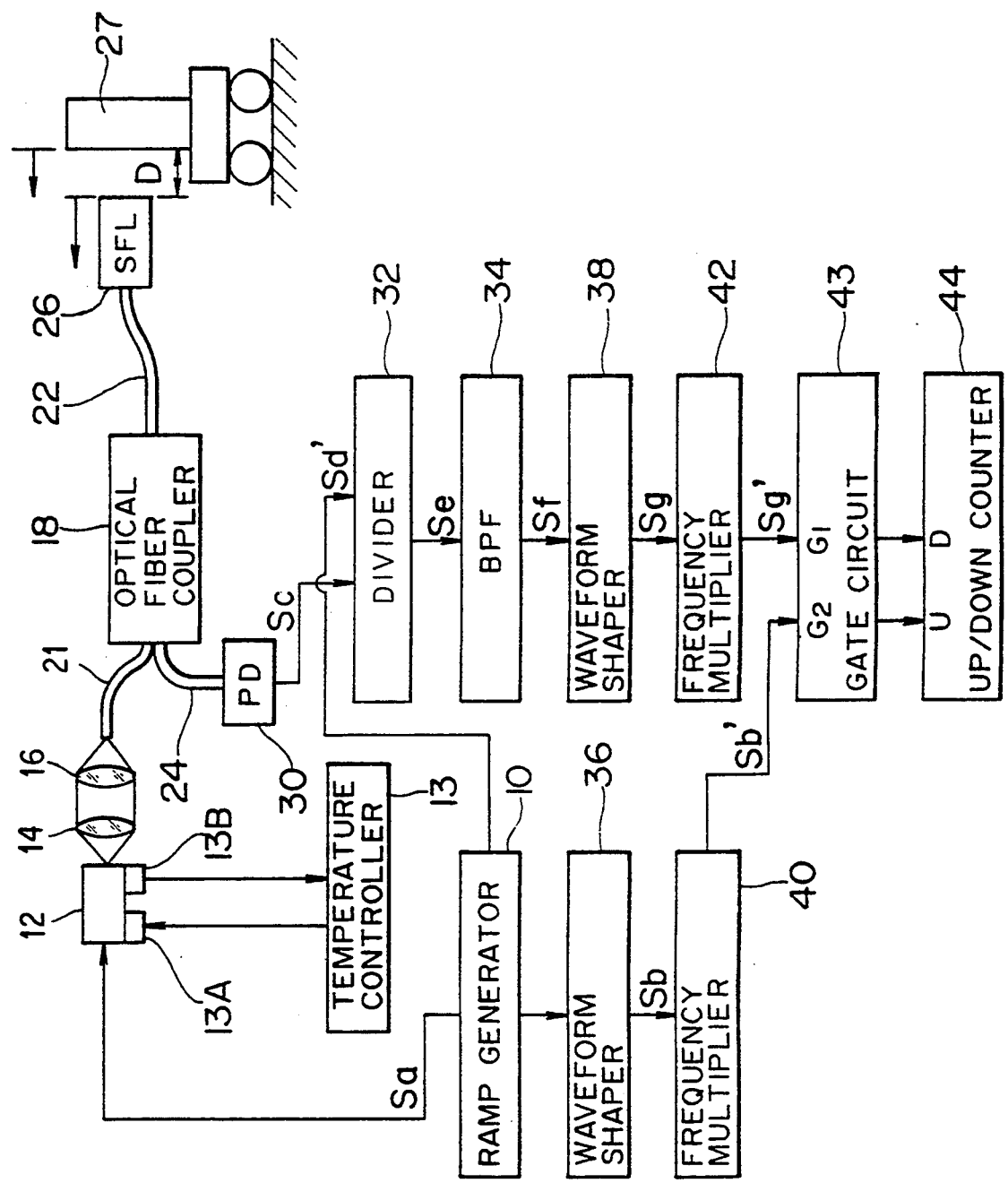
FIG. 3 is a block diagram showing a second embodiment of the present invention.

The divider 32 of the first embodiment, which is shown in FIG. 1, divides the output signal of the photodiode 30 by the output signal of the photodiode 28. Alternatively, the output signal of the photodiode 30 may be also divided by the output signal Sd' of the ramp generator 10, as shown in FIG. 3. In this variant, the optical fiber 23 and photodiode 28 shown in FIG. 1 become unnecessary. Incident light from the optical fiber 21 travels to the optical fiber 22 only. Thus, the intensity of light irradiating the test surface becomes stronger. Alternatively, the output signal of the photodiode 30 may be divided by the output of a monitor photodiode (not shown) that is incorporated in the laser diode 12.

Furthermore, the waveform of a modulation current is not limited to a sawtooth waveform. A triangular wave or even a sine wave may be used if only the linear portion or almost linear portion of the wave is used. The triangular or sine wave will permit a higher modulation frequency $f_s$ than a sawtooth wave.

Next, the signals at the aforesaid components will be expressed using the equations below.

The output signal Se(t) of the divider 32 by which the light emission intensity of a laser diode 12 is removed is represented as follows:

$$Se(t) = A \cdot \cos(\omega_b t + \phi_b) \quad (1)$$

where, the angular frequency $\omega_b$ and phase $\phi_b$ are provided as follows:

$$\omega_b = 2 \frac{\Delta \omega}{T_s} \cdot \frac{2D}{C}, \quad (2)$$

$$\phi_b = 2\pi \frac{2D}{\lambda_o}. \quad (3)$$

Figure 4:
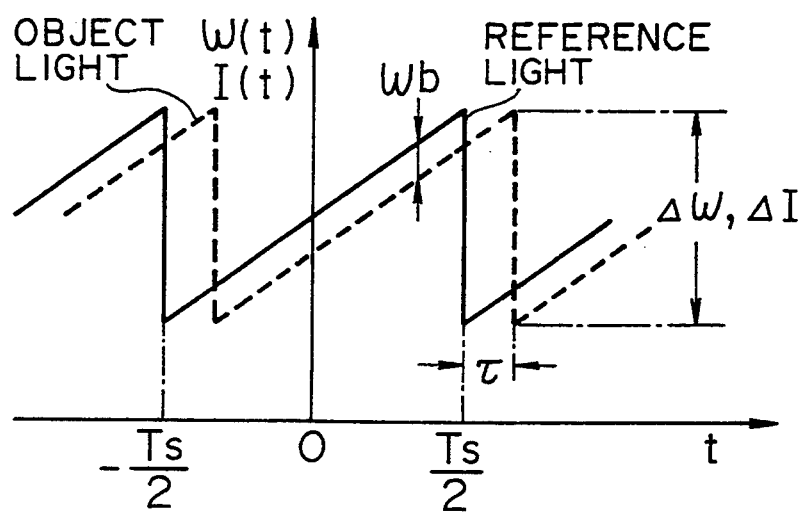
FIG. 4 shows waveforms for indicating oscillation frequencies and intensity changes of object light and reference light.

As shown in FIG. 4, $\Delta\omega$ is an angular frequency modulation amplitude, C is the speed of light, and $\lambda_o$ is the wavelength of a laser diode 12 driven by a bias current $i_0$.

The signal Sf(t) provided by the bandpass filter 34 is represented as follows:

$$Sf(t) = B \cdot \cos(\omega_s t + \phi_b) \quad (4)$$

Assuming that a test surface moves from an initial distance $D_0$ at a speed V, the distance D is expressed as the equation below, $$D = D_0 + Vt \quad (5)$$

the equation (4) is rewritten as follows:

$$Sf(t) = B \cdot \cos\{2\pi[(f_s + \Delta f_D)t + 2D_0/\lambda_0]\} \quad (6)$$

where, $\Delta f_D$ is a Doppler frequency shift resulting from the movement of the test surface and provided as the equation below.

$$\Delta f_D = SV/\lambda_0 \quad (7)$$

To extract Sf(t) with sufficiently large amplitude B using the bandpass filter 34, $\Delta f_D$ must be smaller than the bandwidth $\Delta v$ of the bandpass filter 34. Therefore, a maximum moving speed $V_{max}$ of the test surface is limited as follows:

$$V_{max} = \lambda_0/2 \cdot \Delta v \quad (8)$$

As shown in Equation 8, to increase the maximum moving speed $V_{max}$, the bandwidth $\Delta v$ of the bandpass filter 34 must be large enough. Since the signal Se provided by the divider 32 is modulated periodically at an interval of period $T_s$, the signal Se is composed of frequency components of $f_s$, $2f_s$, ..., $nf_s$... In the embodiment shown in FIG. 1, the center frequency of the bandpass filter 34 is $f_s$. Assuming that a bandpass filter having a center frequency $nf_s$ is used to extract a component of the frequency $nf_s$, the equation (4) is rewritten as follows:

$$\begin{aligned} Sf(t) &= B \cdot \cos(n\omega_s t + \phi_b) \\ &= B \cdot \cos[2\pi(nf_s + \Delta f_D)t] \end{aligned}$$

Then, when $\Delta v$ is set to be one-tenth of the center frequency $nf_s$, the equation (8) becomes:

$$\begin{aligned} V_{max} &= \lambda_0/2 \cdot \Delta v \\ &= \lambda_0/2 \cdot nf_s/10 \end{aligned} \quad (9)$$

Consequently, higher n and $f_s$ result in a higher maximum speed.

However, when the oscillation frequency of the laser diode 12 is modulated linearly using a drive current, frequency $f_s$ of the drive current is restricted by the characteristic of the laser diode.

On the contrary, the amplitude of the frequency component extracted by the bandpass filter is determined according to a sine function $\sin[(\omega_b - n\omega_s)T_s/2]/[(\omega_b - n\omega_s)T_s/2]$. If $n\omega_s$ is equal to $\omega_b$, the sine function provides a maximum value 1. Then, the sine function shrinks rapidly as the difference between $\omega_b$ and $n\omega_s$ increases. Therefore, when the difference exceeds a certain value, the amplitude B of the output signal of the bandpass filter 34 becomes too small and the waveform shaper 38 does not output an accurate pulse signal. This disables the measurement.

Under the above conditions, the value of n is restricted. However, if the angular frequency $\omega_b$ of a beat signal is increased, n can assume a large value.

As shown in Equation (2), to increase the angular frequency $\omega_b$, the frequency modulation amplitude $\Delta\omega$ of the laser diode 12 or the distance D must be increased.

Figure 5:
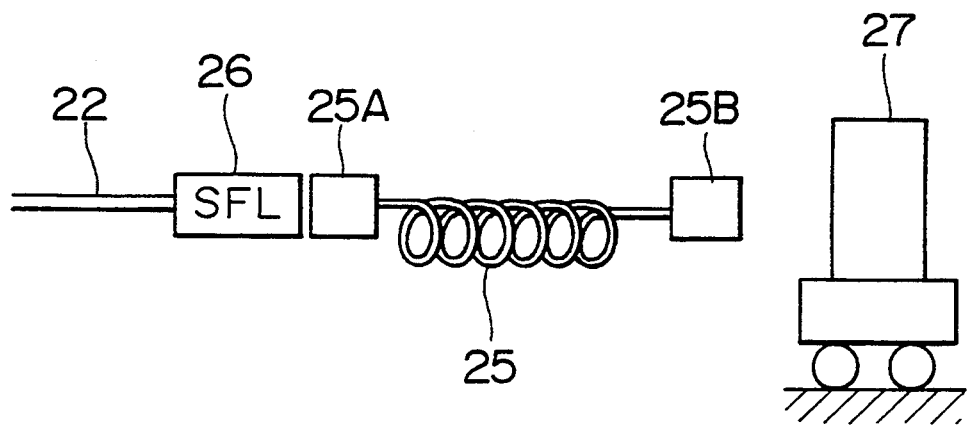
FIG. 5 is a schematic diagram showing a major part of a third embodiment of the present invention.

FIG. 5 is a schematic diagram showing a major part of the third embodiment of the present invention. As shown in FIG. 5, in this embodiment, an optical fiber 25 is installed to extend a light path between the rod lens 26 and a test surface of an object 27. AR-coated rod lenses 25A and 25B are connected to the optical fiber 25. The employment of the optical fiber 25 results in a light path that is much longer than a distance from the rod lens 26 and object under test. Thus, when the optical fiber 25 is employed, $\omega_b$ becomes larger and n can be assumed to be a larger value. In other words, the maximum moving speed $V_{max}$ becomes higher.

When the center frequency of the bandpass filter 34 is set to $nf_s$, the frequency of the pulse signal Sb' of a frequency multiplier 40 must also be multiplied by n.

In the embodiments shown in FIGS. 1 and 3, the divider 32 is used to remove the effect of the change in light emission intensity of the semiconductor laser 12. In the fourth embodiment shown in FIG. 6, the use of a divider can be omitted on the basis of the principles below.

First, modulations of the oscillation frequency and the light emission intensity of a laser diode will be described.

When a sawtooth modulation current Sa(t) having a period $T_s$ and a modulation amplitude $\Delta i$ as shown in FIG. 7A is fed to a laser diode, the oscillation angular frequency $\omega(t)$ and light emission intensity I(t) of the laser diode are also modulated in the form of sawtooth waves (See FIGS. 7B and 7C).

In the above discussion, assuming that the sawtooth modulation current Sa(t) during one modulation period $(-T_s/2 \leq t < T_s/2)$ is expressed as the equation below, $$Sa(t) = i_0 + \Delta i / T_s \cdot t = i_0 + a_i \cdot t \quad (10)$$

the oscillation angular frequency $\omega(t)$ and light emission intensity I(t) are written as follows:

$$\omega(t) = \omega_0 + \Delta\omega/T_s \cdot t = \omega_0 + k_{wi} \cdot a_i \cdot t \quad (11)$$

$$I(t) = I_0 + \Delta I/T_s \cdot t = I_0 + k_{Ii} \cdot a_i \cdot t \quad (12)$$

Herein, the definitions of $i_0$, $\omega_0$, $I_0$, $\Delta i$, $\Delta\omega$, and $\Delta I$ are as shown in FIG. 7. Moreover, $a_i = \Delta i / T_s$ (current modulation rate)

$k_{wi} = \Delta\omega/\Delta i$ (modulation constant of an oscillation angular frequency)

$k_{Ii} = \Delta I/\Delta i$ (modulation constant of a light emission intensity)

Next, an interference signal detected by the photodiode 30 shown in FIG. 6 will be described.

It is assumed that a light emission intensity for a laser diode 12 to send light to a rod lens 26 is $\eta I(t)$. Herein, $\eta$ denotes a constant that is determined by a coupling coefficient for coupling a laser beam to an optical fiber 21 and by a distribution factor of the optical fiber coupler 18. Assuming that the intensity of the reference light is $I_r(t)$ and that of the object light is $I_0(t)$, $I_r(t)$ and $I_0(t)$ are provided as follows:

$$I_r(t) = \beta_r \cdot \eta I(t) \quad (13)$$

$$I_0(t) = \beta_0 \cdot \eta I(t) \quad (14)$$

where $\beta_r$ and $\beta_0$ are reflection coefficients.

The reference light and object light cause heterodyne interference. An interference signal Se(t) detected by the photodiode 30 is represented as follows:

$$Se(t) = K \cdot \eta I(t)[\beta_r + \beta_0 + 2(\beta_r \beta_0)^{\frac{1}{2}} \cos(\omega_b t + \phi_b)] \quad (15)$$

where K denotes a photoelectric transfer rate of the photodiode 30.

In the procedure of the first embodiment shown in FIG. 1, I(t) in the equation (15) is eliminated using the divider 32. Then, DC components $(\beta_r + \beta_0)$ are cut off to obtain the aforesaid equation (1).

In the fourth embodiment shown in FIG. 6, since I(t) in the equation (15) is expressed as the equation (12), if $(k_{Ii} \cdot a_i \cdot t)$ is much smaller than $I_0$ and the expression below is satisfied, $(k_{Ii} \cdot a_i \cdot t)$ can be ignored.

$$I_0 >> |k_{Ii} \cdot a_i \cdot t_{max}| = k_{Ii} \cdot a_i \cdot T_s/2 = k_{Ii} \cdot \Delta_i/2 \quad (16)$$

In this case, the equation (15) is approximated to the equation below.

$$Se(t) \approx K \cdot \eta I_0 x [\beta_r + \beta_0 + 2(\beta_r \beta_0)^{\frac{1}{2}} \cos(\omega_b t + \phi_b)]. \quad (17)$$

Consequently, if DC components $(\beta_r + \beta_0)$ are cut off, the equation (1) is obtained.

To satisfy the expression (16):
(1) $I_0$ must be increased.
(2) $\Delta i$ must be decreased.
(3) $k_{Ii}$ must be decreased.

The above items (1) and (2) means that the bias current $i_0$ of the modulation current Sa(t) expressed as the equation (10) must be increased and the modulation amplitude $\Delta_i$ of the modulation current Sa(t) must be decreased. $k_{Ii}$ in the item (3) represents a characteristic specific to a laser diode, whose value cannot, therefore, be changed freely. A solution for the item (3) is to select a laser diode having a small $k_{Ii}$ but having a large $k_{wi}$.

Figure 6:
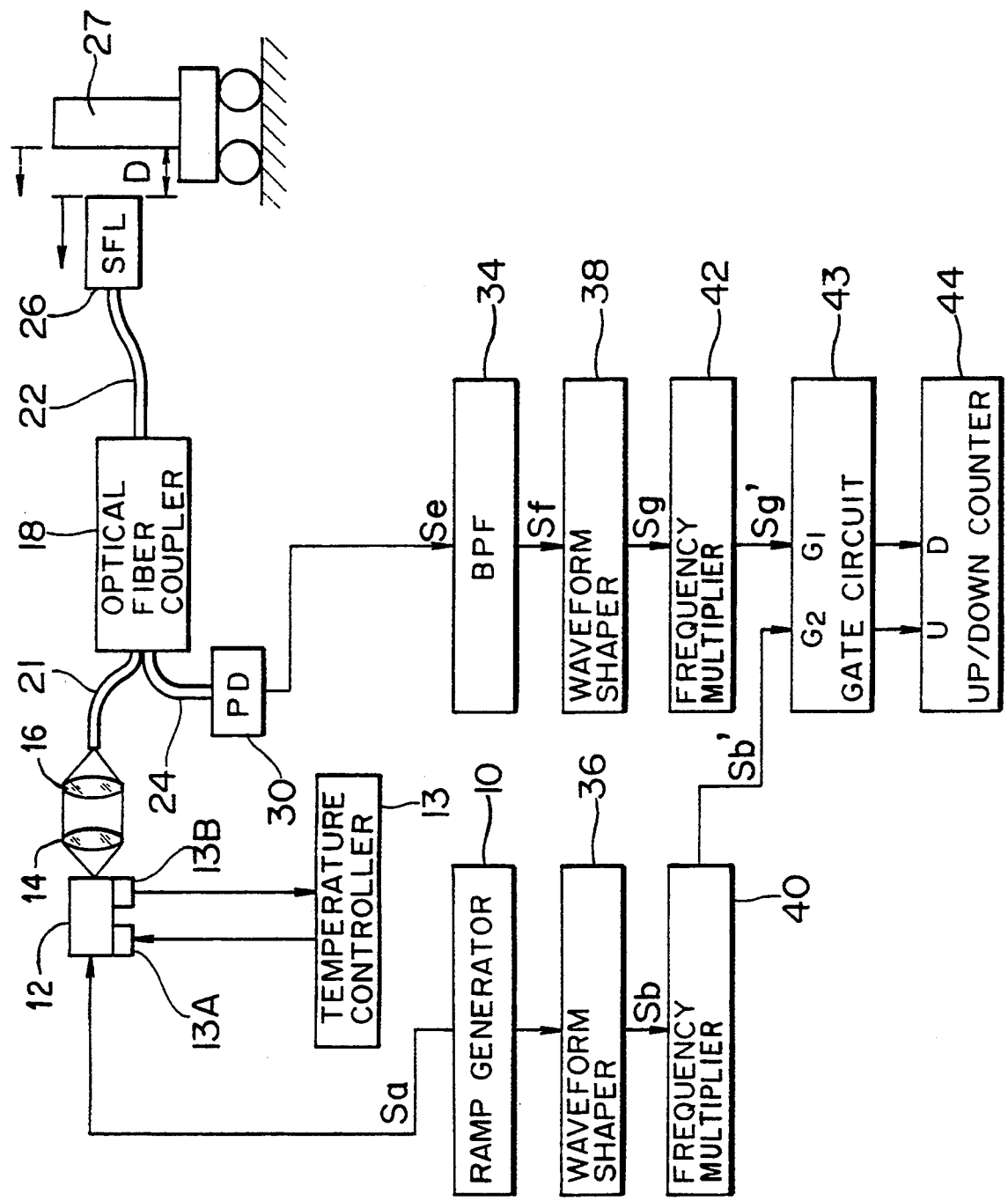
FIG. 6 is a block diagram showing a forth embodiment of the present invention.

A ramp generator 10 shown in FIG. 6 provides a bias current with a sawtooth modulation current Sa having a small modulation width. Thereby, the effect of the light emission intensity of the laser diode in signal Se, as shown in FIG. 8B, becomes negligible.

As apparent from comparison between FIGS. 1 and 6, the embodiment shown in FIG. 6 may not include an optical fiber 23, a photodiode 28, and a divider 32. In FIG. 6, components identical to those in FIG. 1 are assigned the same numerals. The description will, therefore, be omitted.

Furthermore, in the above embodiments, a Doppler frequency shift associated with a moving speed of an object 27 is utilized to measure a displacement of the object 27. Alternatively, the angular frequency of a beat signal of an interference signal Sc(t) detected by the photodiode 30 shown in FIG. 1 may be used to measure absolute distance. From Equation (2), the distance D is represented as follows:

$$D = (T_s \cdot C/(4\Delta\omega)) \cdot \omega_b \quad (18)$$

Thus, the distance D is calculated by measuring $\omega_b$.

The angular frequency $\omega_b$ of a beat signal is proportional to the distance D between the rod lens 27 and the test object's surface 27. Therefore, when an optical fiber 25 is installed between the rod lens 26 and the test surface of the object under test 27 as shown in FIG. 5, $\omega_b$ increases, and, eventually precision in measuring $\omega_b$ improves.

As described so far, according to the present invention, almost all light paths of the laser beams are constructed using optical fibers and an optical coupler. This construction is hardly affected by the test environment. Therefore, a displacement can be measured effortlessly with high precision and high resolution. Moreover, the sensor can be designed compactly. Furthermore, since a Doppler frequency shift resulting from a movement of a test surface is used for measurement, the displacement of a moving object under test can be measured in real time.

In prior arts, a reflecting mirror is usually attached on a test surface. In the present invention, the test surface is not limited to the reflecting mirror but may be a rough surface of a metal, plastic, acrylic, paper, or any other material even if it is inclined. Experimental measurements have proven that the measurement can be done irrelevant of the textures of the test surface.

It should be understood, however, that there is no intention to limit the invention to the specific forms disclosed, but on the contrary, the invention is to cover all modifications, alternate constructions and equivalents falling within the spirit and scope of the invention as expressed in the appended claims.

We claim:

1. A heterodyne interferometric optical fiber displacement sensor, comprising:
   a laser diode;
   a modulation current generating means for outputting a modulation current whose value varies periodically at an interval of $T_s$ (in frequency $f_s$);
   first, second, third, and fourth optical fibers;
   a first lens for guiding a laser beam from said laser diode to the tip of said first optical fiber;
   an optical fiber coupler that optically couples said first, second, third, and fourth optical fibers, said optical fiber coupler distributing light transmitted through said first optical fiber into said second and third optical fibers, and routing light returned through said second optical fiber to said fourth optical fiber;
   a second lens that is attached to the tip of said second optical fiber, and that reflects part of light at the exit surface and transmits the remaining light which will irradiate an object surface;
   first and second photoelectric transfer devices that are attached to the tips of said third and fourth optical fibers and that photoelectrically transfer incident light coming through said third and fourth optical fibers;
   a divider that divides the output of said second photoelectric transfer device by the output of said first photoelectric transfer device;
   a bandpass filter for extracting a frequency component, whose center frequency is $nf_s$ that is n-fold of the frequency $f_s$ of said modulation current, from the output of said divider;
   a first pulse output means that outputs a pulse signal having a frequency which is m-fold of the frequency of the output wave of said bandpass filter;
   a second pulse output means that outputs a pulse signal having a frequency which is m-fold of the same frequency as said frequency $nf_s$; and
   a counter for accumulating the difference in frequency between pulse signals provided by said first and second pulse output means, which is attributable to the relative movement between said second lens and said object surface.

2. A heterodyne interferometric optical fiber displacement sensor according to claim 1, wherein said modulation current generating means is a ramp generator that generates a sawtooth modulation current.

3. A heterodyne interferometric optical fiber displacement sensor according to claim 1, wherein said modulation current generating means is a modulation current generator that generates a triangular modulation current.

4. A heterodyne interferometric optical fiber displacement sensor according to claim 1, wherein said second lens is a rod lens that collimates the incident light which will irradiates said object surface.

5. A heterodyne interferometric optical fiber displacement sensor according to claim 1, further comprising an offset optical fiber that is placed between said second lens and said object surface for extending the light path from said second lens to said object surface.

6. A heterodyne interferometric optical fiber displacement sensor, comprising:
   a laser diode;
   a modulation current generating means for outputting a modulation current whose value varies periodically at an internal of $T_s$ (in frequency $f_s$);
   first, second, and third optical fibers;
   a first lens for guiding a laser beam from said laser diode to the tip of said first optical fiber;
   an optical fiber coupler that optically couples said first, second, and third optical fibers, said optical fiber coupler routing light transmitted through said first optical fiber to said second optical fiber, and also routing light returned through said second optical fiber to said third optical fiber;
   a second lens that is attached to the tip of said second optical fiber, and that reflects part of light at the exit surface and transmits the remaining light which will irradiate an object surface;
   a photoelectric transfer device that is attached to the tip of said third optical fiber and that photoelectrically transfers incident light coming through said optical fiber;
   a divider that divides the output of said photoelectric transfer device by the output of said modulation current generating means;
   a bandpass filter for extracting a frequency component, whose center frequency is $nf_s$ that is n-fold of the frequency $f_s$ of said modulation current, from the output of said divider;
   a first pulse output means that outputs a pulse signal having a frequency which is m-fold of the frequency of the output wave of said bandpass filter;
   a second pulse output means that outputs a pulse signal having a frequency which is m-fold of the same frequency as said frequency $nf_s$; and
   a counter for accumulating the difference in frequency between pulse signals provided by said first and second pulse output means, which is attributable to the relative movement between said second lens and said object surface.

7. A heterodyne interferometric optical fiber displacement sensor, comprising:
   a laser diode;
   a modulation current generating means for outputting a modulation current whose value varies periodically at an interval of $T_s$ (in frequency $f_s$);
   first, second, and third optical fibers;
   a first lens for guiding a laser beam from said laser diode to the tip of said first optical fiber;
   a first photoelectric transfer device that is contained in the package of said laser diode and that photoelectrically transfers the laser beam from said laser diode;
   an optical fiber coupler that optically couples said first, second, and third optical fibers, said optical fiber coupler routing light transmitted through said first optical fiber to said second optical fiber, and also routing light returned through said second optical fiber to said third optical fiber;
   a second lens that is attached to the tip of said second optical fiber, and that reflects part of light at the exit surface and transmits the remaining light to provide parallel light which will irradiate an object surface;

a second photoelectric transfer device that is attached to the tip of said third optical fiber and that photoelectrically transfers incident light coming through said third optical fiber;

a divider that divides the output of said second photoelectric transfer device by the output of said first photoelectric transfer device;

a bandpass filter for extracting a frequency component, whose center frequency is $nf_s$ that is n-fold of the frequency $f_s$ of said modulation current, from the output of said divider;

a first pulse output means that outputs a pulse signal having a frequency which is m-fold of the frequency of the output wave of said bandpass filter;

a second pulse output means that outputs a pulse signal having a frequency which is m-fold of the same frequency as said frequency $nf_s$; and a counter for accumulating the difference in frequency between pulse signals provided by said first and second pulse output means, which is attributable to the relative movement between said second lens and said object surface.

8. A heterodyne interferometric optical fiber displacement sensor, comprising:

a laser diode;

a modulation current generating means for outputting a modulation current whose value varies periodically at an interval of $T_s$ (in frequency $f_s$);

first, second, and third optical fibers;

a first lens for guiding a laser beam from said laser diode to the tip of said first optical fiber;

an optical fiber coupler that optically couples the backs of said first, second, and third optical fibers, said optical fiber coupler routing light transmitted through said first optical fiber to said second optical fiber, and also routing light returned through said second optical fiber to said third optical fiber;

a second lens that is attached to the tip of said second optical fiber, and that reflects part of light at an exit surface and transmits the remaining light which will irradiate an object surface;

a photoelectric transfer device that is attached to the tip of said third optical fiber and that photoelectrically transfers incident light coming through said third optical fiber;

a bandpass filter for extracting a frequency component, whose center frequency is $nf_s$ that is n-fold of the frequency $f_s$ of said modulation current, from the output of said photoelectric transfer device;

a first pulse output means that outputs a pulse signal having a frequency which is m-fold of the frequency to the output wave of said bandpass filter;

a second pulse output means that outputs a pulse signal having a frequency which is m-fold of the same frequency as said frequency $nf_s$; and a counter for accumulating the difference in frequency between pulse signals provided by said first and second pulse output means, which is attributable to the relative movement between said second lens and said object surface.

9. A heterodyne interferometric optical fiber displacement sensor according to claim 8, wherein said modulation current generating means is a ramp generator that generates a modulation current which results from the superimposition of a sawtooth wave having a small modulation amplitude on a bias current.

10. A heterodyne interferometric optical fiber displacement sensor according to claim 8, wherein said modulation current generating means is a triangular modulation current generator that generates a modulation current which results from the superimposition of a triangular wave having a small modulation amplitude on a bias current.

11. A heterodyne interferometric optical fiber displacement sensor according to claim 8, wherein said second lens is a rod lens that collimates the incident light which will irradiates said object surface.

12. A heterodyne interferometric optical fiber displacement sensor according to claim 8, further comprising an offset optical fiber that is placed between said second lens and said object surface and that extends the light path between said second lens and said object surface.

* * * * *